United States Patent [19]

Oetiker

[11] 3,981,049

[45] Sept. 21, 1976

[54] CLAMPING DEVICE WITH TIGHTENING DEVICE

[76] Inventor: Hans Oetiker, 21, Oberdorfstrasse, Horgen, Switzerland

[22] Filed: Apr. 1, 1975

[21] Appl. No.: 564,132

Related U.S. Application Data

[63] Continuation of Ser. No. 349,697, April 10, 1973, abandoned.

[30] Foreign Application Priority Data

Apr. 11, 1972 Switzerland........................ 5273/72
Aug. 9, 1972 Switzerland...................... 11744/72

[52] U.S. Cl................................. 24/20 TT; 81/9.3; 145/50 A
[51] Int. Cl.².................. B65D 63/02; B25B 27/10; B25B 15/00
[58] Field of Search .......... 24/20 CW, 20 TT, 20 R, 24/20 W, 20 S, 20 LS, 20 EE; 81/9.3; 145/50 A

[56] References Cited
UNITED STATES PATENTS

| | | | |
|---|---|---|---|
| 720,308 | 2/1903 | Wood........................ | 24/20 LS UX |
| 819,289 | 5/1906 | Kootz et al................ | 145/50 A UX |
| 1,472,966 | 11/1923 | Englund........................... | 24/20 TT |
| 1,705,895 | 3/1929 | Blair ................................ | 24/20 TT |
| 1,965,207 | 7/1934 | Walker ............................ | 24/20 TT |
| 2,374,541 | 4/1945 | Hartman.......................... | 24/20 TT |
| 2,876,514 | 3/1959 | Murphy........................... | 24/20 CW |
| 3,261,062 | 7/1966 | Scarborough..................... | 81/9.3 X |
| 3,402,436 | 9/1968 | Oetiker............................ | 24/20 CW |
| 3,475,793 | 11/1969 | Oetiker............................ | 24/20 CW |
| 3,510,918 | 5/1970 | Oetiker.................... | 24/20 CW UX |

FOREIGN PATENTS OR APPLICATIONS

| | | | |
|---|---|---|---|
| 1,187,079 | 2/1965 | Germany ......................... | 24/20 TT |
| 400,139 | 10/1933 | United Kingdom..................... | 81/9.3 |
| 469,568 | 7/1937 | United Kingdom..................... | 81/9.3 |

*Primary Examiner*—Donald A. Griffin
*Attorney, Agent, or Firm*—Craig & Antonelli

[57] ABSTRACT

A clamp for clamping a hose onto a nipple by means of a band adapted to be locked which is provided at its upper band end with perforation apertures and includes at least one barb at its lower band end which engages in one of the perforation apertures when the band is placed about the hose; the band is also provided at its lower end, on the side toward the band end with respect to the barb, with further perforation apertures of the same type and is additionally provided with a slot at its upper end which is located in the circumferential direction toward the center of the band with respect to the perforation apertures provided thereat; at least one section of the further perforation apertures disposed adjacent the lower band end is located within the area of the section of the slot disposed adjacent the upper end of the band when the band is placed about the hose; the upper end of the band is provided between its perforation apertures and the barbs of the lower end of the band with at least one further barb pointing with its tip opposite the tip of the barbs of the lower end of the band; a tightening device is provided for tightening the clamp about the hose which includes two coupling elements movable with respect to one another, of which one coupling element engages in at least one of the perforation apertures of the lower end of the band while the barb of the upper end of the band engages into the other coupling element.

41 Claims, 7 Drawing Figures

CLAMPING DEVICE WITH TIGHTENING DEVICE

This is a continuation of application Ser. No. 349,697 filed Apr. 10, 1973 and now abandoned.

The present invention relates to a clamp for securely clamping a hose onto a nipple by means of a band adapted to be closed or locked which is provided at the upper end thereof with perforation apertures and at the lower end thereof with at least one barb which engages into one of the perforation apertures when the band is placed about the hose, and in which the band is provided with perforation apertures of the same type at its lower end and on the side of the barb toward the respective end and with a slot displaced in the circumferential direction toward the center of the band with respect to the perforation apertures existing thereat whereby after placing the band about the hose at least one section of the perforation apertures adjacent the lower end is located within the area of the section of the slot adjacent the upper end of the band, and including a tightening device which enables the hooking engagement of the barb in the perforation aperture corresponding to the assembled condition of the clamp, which tightening device is adapted to be attached to the clamp for assembly and disassembly and is again removable after completed assembly or disassembly.

A clamp is known in the prior art which is provided with a tightening device in the manner of a bayonnet-type joint which involves an expensive manufacture and is inappropriate, especially if the clamp has to be installed and disassembled only infrequently. Another clamp is also known in the prior art in which the tightening takes place by means of a tong-like tool, the engaging end of which expands upon pressing together the actuating end. The attachment of the tool takes place, on the one hand, in a perforation aperture and, on the other, at the end of the slot. This type of tightening, however, entails the disadvantage that the band thickness generally is only of the order of one millimeter so that the engaging surface for the tool is small. Added thereto is the fact that in addition to the pressing together of the actuating part of the tool, the latter has to be pressed with a certain force in a radial direction against the band, in which case a catching or getting stuck in the elastic hose material and a damage thereof has to be feared. Furthermore, such an operation requires the full attention of the working personnel, whence the observation and attention to the hooking-in of the barb into the correct perforation aperture necessarily suffers. With such a tightening device, the actuating part also has to have a certain length so that this tool cannot be used in all cases.

The clamps described hereinabove all include at least one element which is elastically yielding in the circumferential direction so that during the installation no excessively high forces have to be overcome. However, it may be desirable for example, for reasons of reducing the manufacturing costs to give to the band a continuous flat shape throughout whereby the prestress existing in the assembled condition of the clamp is produced only by elastic deformation of the hose. In that case, however, quite considerable forces arise during the assembly, i.e., during the tightening from perforation aperture to perforation aperture, which cannot be absorbed by the prior art tightening device adapted to be attached and removed. Furthermore, it must be borne in mind that though an assembly by means of the known tightening device might still be realized, as such, in contrast thereto, a disassembly is no longer readily feasible after a lapse of some time since the clamp has worked itself into the elastic hose material, and as a result of dirt, heat influence, etc., now sticks to the hose, so that the band or the ear-shaped spring or tensioning elements have to be cut open destructively whence the clamp can no longer be reused thereafter.

The present invention is concerned with the task of overcoming these disadvantages and to provide a clamp which is adapted to be tightened to a very high degree and is repeatedly reusable, whereby the tightening device can be attached reliably also under unfavorable space conditions, and more particularly in such a manner that the attachment and the actuation thereof can take place also at a certain distance from the clamp. To that end a clamp of the aforementioned type is constructed in such a manner that the upper end of the band is provided in the circumferential direction toward the center with respect to the slot, with at least one barb pointing with its tip opposite the tip of the barb of the lower end of the band, and in that the tightening device includes two coupling members movable with respect to one another for purposes of tightening, whereby one of the coupling members engages in at least one of the perforation apertures of the lower end of the band and the barb of the upper end of the band engages in the other coupling member.

Owing to these measures, the tightening device can be attached reliably onto the band, and it securely remains adhering to the band during the tightening operation, and also a large, finely proportioned tensioning or tightening force can be produced.

According to one special embodiment, the lower end of the band is provided with an upwardly bent tongue which is guided in the slot. It is achieved thereby that the surface of the hose is protected and that the ends of the band overlap reliably.

According to another special type of construction of the present invention the band has a flat configuration whereby a prestress existing in the assembled condition of the clamp is produced only by the elastic deformation of the hose. The new type of tightening device enables the use of the aforementioned, particularly inexpensive construction of the band.

According to a further embodiment of the present invention, the band includes at least one elastically deformable ear-shaped bulge. This type of construction takes into consideration the fact that a tightening of the band from perforation aperture to perforation aperture by means of the tightening device does not allow intermediate steps of the prestress. It is then advantageous, for example, if the hose material is not particularly elastic. However, it also serves for the purpose of compensation of diameter changes of the nipple caused, for example, by the influence of heat.

According to a further special type of construction, the band is provided with at least one contractible ear-shaped bulge. In this type of construction, intermediate values of the desired prestress can be readily achieved by differing contractions of the bulge. The tightening tool actuated either manually or by means of a servo-force, for example, by compressed air, may be combined with a force-measuring device so that also in case of unavoidable differences of the diameter of the nipple, of the length of the band, of the elasticity of the hose, etc., always the same prestress of the clamp can be adduced reliably and rapidly in a simple manner also in case of mass assembly operations.

According to another special embodiment of this invention, the contractible ear-shaped bulge is provided within the area of its top or crown with an indentation. This measure enables a contraction without the danger that the top bends outwardly in the shape of a pointed tip which would reduce the elasticity of the crown. The indentation has preferably an eliptical shape extending in the circumferential direction of the band.

According to a further embodiment of the present invention the band is separated at least in one place, and each of the band ends is provided with a perforation aperture which perforation apertures are placed in mutual overlapping position in such a manner that they are aligned with one another whereby a spring element connecting the ends of the band and having a ring-shaped center portion and two flat end portions is inserted through the aligned perforation apertures in such a manner that the end portions extend on the outer surface of the hose in opposite directions and that the band ends move toward one another during the tightening of the clamp.

According to a particular type of construction, the center portion is provided within the area of the top or crown with an indentation. According to a further special type of construction the center portion accommodates an approximately cylindrical member of elastic material. These measures produce a highly elastic band which satisfies all occurring changes of the diameter of the nipple and which also permits the use of a hose of very low elasticity.

A clamp offering particularly versatile use, which also satisfies the most varied requirements, results from a simultaneous use of one of several contractible ear-shaped bulges with one or several of the described elastic elements.

According to a special embodiment of the present invention, the tightening device includes a lever, with which is rigidly connected a toothed wheel having essentially parallel tooth flanks, a pitch essentially corresponding to the perforation apertures and an axis perpendicular to the lever axis, and a short curved band, whose radius corresponds approximately to the radius of the hose; the short curved band is thereby pivotal about the axis of the toothed wheel and is provided with at least one perforation aperture at its free end, whereby the perforation aperture of the tightening device engages in the barbs nearer the upper end of the band, and depending on the rotational position of the toothed wheel, one tooth each of the toothed wheel engages in a perforation aperture of the lower end of the band.

These measures produce a safe and secure seating of the tensioning or tightening device on the band whereby a rotation of the lever in the direction toward the upper end of the band against a certain resistance, produces automatically the necessary pull of the toothed wheel in the radial direction owing to the curved configuration of the short band in the circumferential direction.

According to a special type of construction the short band of the tightening device includes a slot located between the perforation aperture thereof and the toothed wheel for receiving the tongue of the lower end of the lower end of the band. This measure is appropriate when the tongue projects outwardly by a certain amount beyond the upper end of the band.

According to another embodiment of the present invention, the tightening device includes a sleeve with a longitudinal slot and a threaded spindle rotatable in the sleeve and fixed axially with respect thereto, onto which is screwed an internally threaded counter part axially movable in the longitudinal slot and non-rotatably guided therein, and the sleeve or the counter part are provided with at least one aperture and the counter part or the sleeve with a hook whose tip is directed toward this aperture, whereby the hook engages in a perforation aperture of the lower end of the band and the barb of the upper end of the band engages in an aperture of the tightening device.

These measures enable a tightening of the band for the purpose of assembly and disassembly at a certain distance from the clamp whereby almost no space is required in the direct vicinity of the band. For example, during the installation of sleeves for the universal joint shafts of driven axles of motor vehicles, it is possible for the working personnel to move freely in the assembly pit, under the assembly stage or the assembly lift, and to reach the band to be assembled or disassembled tangentially by means of the described tightening device which may be constructed of any suitable length whereby radially laterally a relatively very small space suffices for the application and removal of the tightening device. It follows as a further advantage that the tightening device, once it is hooked-in and tightened slightly, continues to remain attached at the clamp without any further action so that the hands of the working personnel remain free for any other operation, for example, for the movement of the upper end of the band onto the barb of the lower end of the band whereupon the spindle can also be rotated without difficulty in the sense of a release of the band by means of only one hand whereas the other hand continues to press the upper end of the band in the radial direction until the barb has securely hooked into a perforation aperture.

According to a special embodiment of the present invention, the boundary wall of at least one perforation aperture of the lower end of the band is provided within the area of its surface pointing away from the lower end of the band with a bulge directed upwardly. A reliable gripping of the hook of the tightening device is assured by this measure, and simultaneously, the danger is avoided that the hook damages the surface of the hose.

It may now happen that the described tightening devices are not available, yet the need exists to be able to tighten the band also by means of simplest possible devices, which may even be improvised, if necessary.

According to a special type of construction of this invention, the boundary wall of the slot is therefore provided within the area of its surface pointing away from the upper end of the band with a bulge directed upwardly, and an additional tightening device is provided which is constructed as a strip-shaped instrument whose working end is slightly narrower than the width of the perforation apertures of the lower end of the band, whereby the tightening device can be brought into abutment for the purpose of tightening, on the one hand, against the boundary wall of a perforation aperture of the lower end of the band within the area of its surface pointing away from the lower end of the band, and on the other, against the boundary wall of the slot within the area of its surface pointing away from the lower end of the band, and is pivoted in such a manner that the two mentioned surfaces move away from one another.

It becomes possible by these measures to tighten the band also with the simplest means, for example, with a screwdriver or with an improved sheet metal strip for purposes of assembly or disassembly whereby the provision of the aforementioned bulge which is extraordinarily inexpensive, enables an easy insertion of the additional tightening device and also assures a reliable seating of the tensioning device on the band.

According to another special type of construction, the additional tightening device has a tongue corresponding to the width of the perforation aperture, on both sides of which are provided wings extending perpendicularly to the strip axis. In this manner the depth of penetration of the tongue in the perforation apertures can be limited and a damage to the hose material is prevented.

Accordingly, it is an object of the present invention to provide a clamp and a tightening device for tightening the clamp which avoids by simple means the aforementioned shortcomings and drawbacks encountered in the prior art.

Another object of the present invention resides in a clamp and tightening device for the clamp which is very appropriate for its intended use yet eliminates high manufacturing costs.

A further object of the present invention resides in a clamp and clamp tightening device which permits a safe and reliable attachment of the tool on the clamp without the danger of damage to the hose.

Still a further object of the present invention resides in a clamp and tightening device for the clamp which can be used rather universally, even in applications where little space is available.

Another object of the present invention resides in a clamp and tightening device for the clamp which permits an attachment of the tightening device to the clamp in such a manner that it will automatically remain attached and thus permit tightening from a more remote location.

Still a further object of the present invention resides in a clamp and tightening device for the clamp which provide for a compensation for any changes in the diameter of the nipple, the hose, etc.

Another object of the present invention resides in a clamp of the type described above which permits the use of an improvised device for tightening the same about a hose.

These and other objects, features and advantages of the present invention will become more apparent from the following description when taken in connection with the accompanying drawing which shows, for purposes of illustration only, several embodiments in accordance with the present invention, and wherein:

Referring now to the drawing wherein like reference numerals are used throughout the various views to designate like parts, the thickness of the band is illustrated in all figures larger than in most actual cases for the sake of greater clarity.

Figures 1, 2:
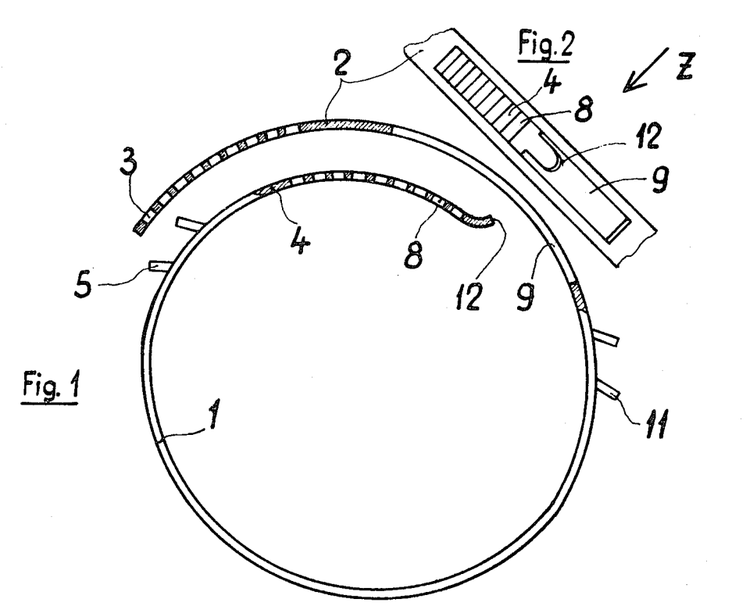
FIG. 1 is an elevational view, partly in cross section, of a band of a clamp according to the present invention, taken in the axial direction and illustrating the clamp in the open condition.
FIG. 2 is a partial plan view on the band according to FIG. 1, taken in the direction of the arrow Z.

Referring now to FIG. 1, the band 1 includes an upper end 2 provided with the perforation apertures 3 as well as a lower end 4 provided with two barbs 5. When the band is placed about the hose 6 (FIG. 3), the barbs 5 engage in two perforation apertures 3 of the upper end 2 of the band 1 as can also be seen clearly from FIG. 3. The hose 6 surrounds a nipple 7. The band is provided at its lower end 4, on the side of the barb 5 nearer the end, with perforation apertures 8 of the same type, and at its upper end 2, displaced in the circumferential direction toward the center of the band in relation to the perforation apertures 3 provided thereat, with a slot 9; after placing the band 1 about the hose 6 at least a section of the perforation apertures 8 adjacent the lower end 4 are then located within the area of the section of the slot 9 adjacent the upper end 2 of the band. Furthermore, a tightening device 10 is provided which enables the barbs 5 to be hooked into the perforation apertures 3 corresponding to the assembled condition of the clamp. This tightening device 10 (FIG. 3) is adapted to be attached onto the band 1 for the assembly and disassembly and is again removable after the assembly has taken place.

The upper end 2 of the band 1 is now provided with two barbs 11 pointing with the tips thereof in a direction opposite the tips of the barbs 5 of the lower end 4; the barbs 11 are thereby provided displaced in the circumferential direction toward the center with respect to the slot 9. The tightening device 10 is now provided with two coupling elements movable with respect to one another for purposes of tightening. One of the coupling elements thereby engages in at least one of the perforation apertures 8 of the lower end 4 of the band while the barbs 11 of the upper end 2 of the band engage in the other coupling element.

The lower end 4 of the band 1 is provided with an upwardly bent tongue 12 which is guided in the slot 9.

Figure 3:
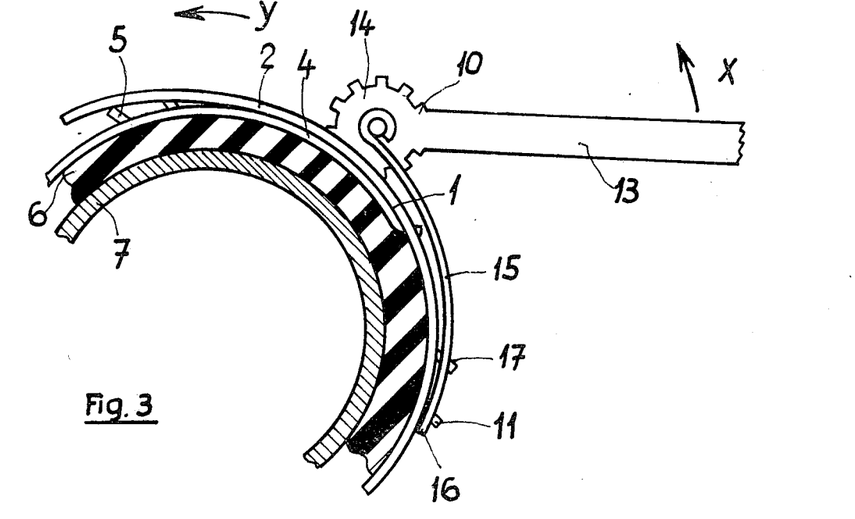
FIG. 3 is a partial cross-sectional view of an installed clamp with a band according to FIG. 1 and with a tightening device of the present invention attached thereto.

The tightening device 10 includes a lever 13, to which is rigidly connected a toothed wheel 14 having parallel tooth flanks, a pitch corresponding to the perforation apertures 3, 8, and an axis perpendicular to the axis of the lever 13. A short curved band 15 whose radius corresponds approximately to the radius of the hose 6, is pivotally connected at the lever 13 about the axis of the toothed wheel 14 and is provided at its free end 16 with two perforation apertures 17, whereby the barbs 11 of the upper end 2 of the band hook engage into the perforation apertures 17 of the short band 15 of the tightening device and, depending on the rotational position of the toothed wheel 14, one or two teeth thereof engage in one or two perforation apertures 8 of the lower end 4 of the band.

If the lever 13 is pivoted in the direction of the arrow X, then the upper end 2 of the band moves in the direction of the arrow Y relative to the lower band end, and the barbs 5 of the lower end 4 of the band can be hooked into those perforation apertures 3 of the upper end 2 of the band which correspond to the desired condition of tension of the band 1. After this has taken place, the lever 13 is again pivoted in the opposite direction, the barbs 5 are reliably and securely hooked in, and the tightening device 10 can be removed. During the removal of the clamp, one will proceed analogously in reverse sequence.

The illustrated band 1 has a flat configuration. The prestress existing in the assembled condition of the clamp is thereby produced only by the elastic deformation of the hose.

The band 15 of the tightening device 10 is provided with a slot, which is located between the perforation apertures 17 thereof and the toothed wheel 14 and which is not visible in the drawing, which serves for receiving the tongue 12 of the lower end 4 of the band.

The modulus of the barbs 11 of the upper end 2 of the band 1 corresponds preferably to the modulus of the perforation apertures 3 and 8 as well as of the barbs 5. In this manner, the same tools can be used which is of importance in connection with cost-savings.

Figures 4, 5:
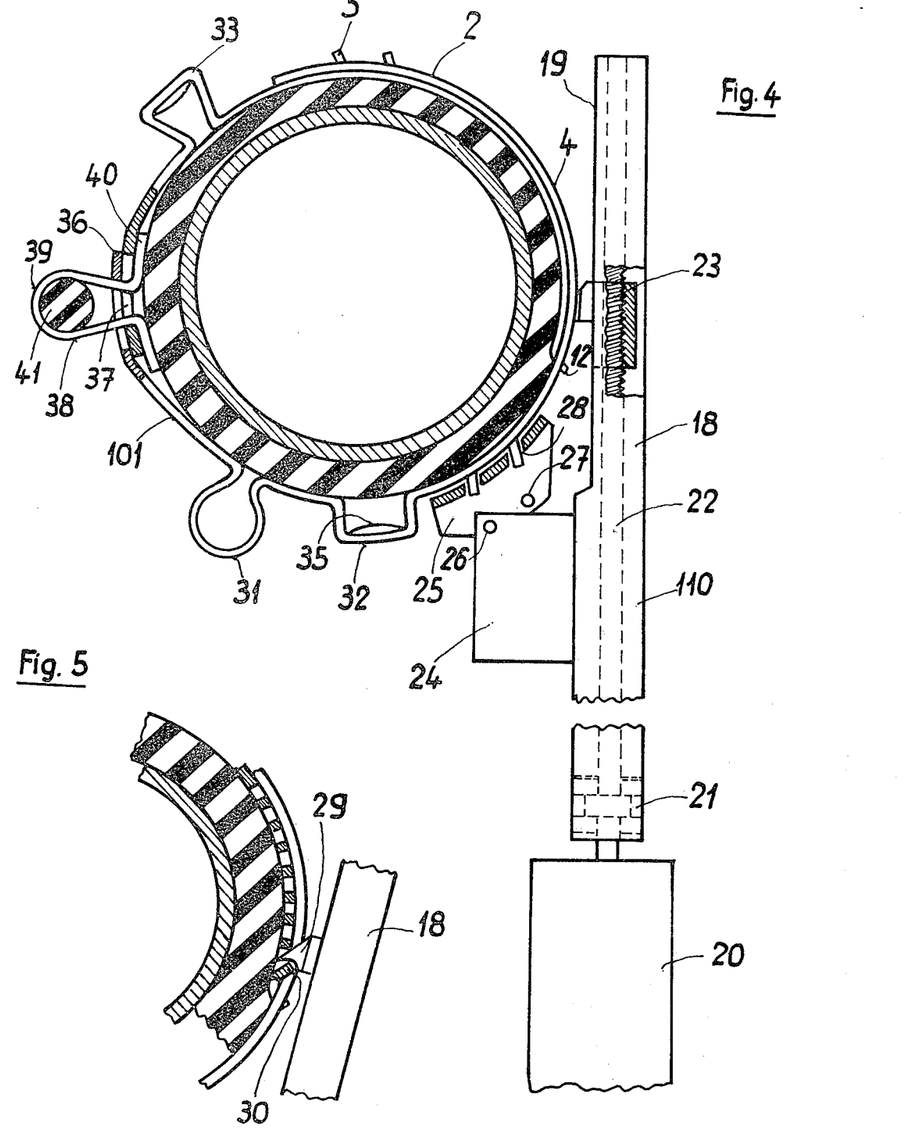
FIG. 4 is a cross-sectional view through an assembled clamp with a modified embodiment of a tightening device in accordance with the present invention and using a different band.
FIG. 5 is a partial cross-sectional view of FIG. 4, on an enlarged scale.

The band 101 illustrated in FIG. 4 corresponds at its upper and at its lower end to the band of FIG. 1. The tightening device 110 includes a sleeve 18 provided with a longitudinal slot 19 and a threaded spindle 22 rotatable therein by means of a handle 20 and axially fixed with respect to the sleeve 18. A counter member 23 which is axially movable in the longitudinal slot 19 and non-rotatably guided with respect thereto is screwed over the threaded spindle 22. The sleeve 188 carries a lug 24. A U-shaped profile member 25 is pivotal about a pin 26 which is extended through apertures in the legs of the profile member 25. A second aperture 27 in the profile member 25 enables the matching of the device to a band of different dimensions. The center portion of the profile member 25 is provided with two apertures 28. The counter member 23 includes a hook 29 whose tip is directed toward the apertures 28. The hook enngages in the perforation aperture 8 adjacent the lower end 4 of the band, and the barbs 11 of the upper end 2 of the band engage in the apertures 28 of the lug 25 fixed to the sleeve 18.

The tightening device 110, once attached to the band 101 and slightly tightened, is seated extraordinarily securely on the assembled band or on the band only placed about the hose and can be finally adjusted thereafter by simple rotation of the handle 20 by the use of only one hand. It may be constructed in practice of any desired length, engages tangentially at the band and requires space only in a tangential direction, as can be readily seen from FIG. 4.

The web 30 adjacent the lower end 4 of the perforation aperture 8, which is disposed adjacent to this lower end 4 of the band, is provided with a bulge in the upward direction, i.e., in the direction toward the upper end 2 of the band. This entails a reliable seating of the hook at the web of the corresponding perforation aperture without endangering the material of the hose by the tip of the hook.

The band 101 is provided altogether with four bulges 31, 32, 33 and 34 distributed over the circumference which for the sake of greater clarity, are shown in exaggeratedly large size. The ear-shaped bulge 31 is elastically deformable. The ear-shaped bulge 32 is adapted to be tensioned or tightened and is illustrated in the untensioned condition. It is provided within the area of its crown or top with an indentation 35 which has an eliptical shape extending in the circumferential direction of the band. The tensionable ear-shaped bulge 33 is illustrated in the tensioned or stressed condition. The band 101 is divided within the area of the bulge 34. Each of the band ends 36 is provided with a perforation aperture 37. These perforation apertures 37 are so positioned in overlapping relationship that they coincide and are aligned with each other. A spring element 38 connecting the band ends which includes a ring-shaped center portion 39 and two flat end sections 40 is so inserted through the perforation apertures 37 that the end portions of the band extend in opposite directions on the outer surface of the hose 6 and the band ends 36 move toward one another during the tightening of the clamp. The center portion 39 accommodates an approximately cylindrical member 41 of elastic material. The center portion 39 may be provided with an indentation within the area of its top whether or not it accommodates the member 41.

The distribution of the bulges 31 to 34 at the circumference depends on the requirements in practice, and the arrangement was represented in the drawing exclusively from a point of view of clarity. The tensionable bulge 32, for example, may be tightened with a tangential attachment of the tightening device 110 by radially engaging compressed air pliers. If a bulge is arranged at the upper end 2 of the band between the perforation apertures 3 and the barbs 11, then it is stressed in deformation, not during the tightening, but only after the removal of the tightening device.

Figure 6:
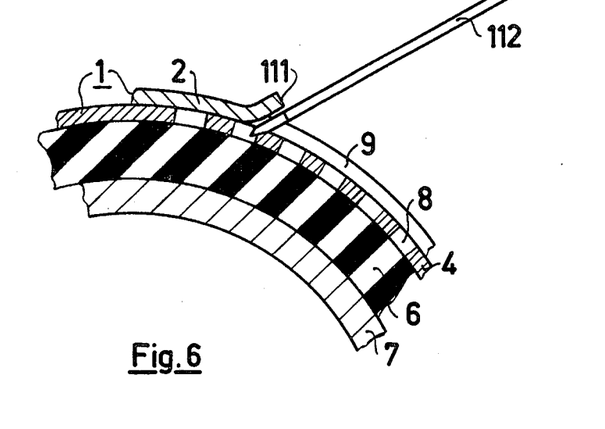
FIG. 6 is a partial cross-sectional view of a modified embodiment of an assembled band with a still further modified embodiment of a tightening device in accordance with the present invention.

The nipple 7 and the hose 8 as well as the upper end of the band 2 provided with the slot 9 and the lower end 4 of the band provided with the perforation apertures 8 can be seen from FIG. 6.

The boundary wall of the slot 9 is now provided within the area of its surface pointing away from the upper end of the band 2 with a bulge 111, directed outwardly, i.e., with a bulge extending upwardly.

Figure 7:
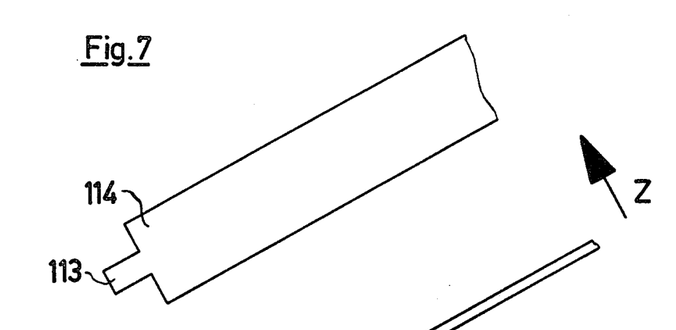
FIG. 7 is an elevational view of the tightening device of FIG. 6 taken in the direction at right angle to the view of FIG. 6.

The additional tightening device 112 is constructed strip-shaped, whereby the working end 113 is slightly narrower than the width of the perforation apertures 8. It can be readily seen from FIG. 7 that the working end 113 is constructed as a tongue which is slightly narrower than the width of the perforation apertures 8 whereby wings 114 are provided on both sides of the tongue which extend perpendicularly to the axis of the strip and limit the depth of penetration of the working end 113 into the perforation apertures 8. By pivoting the end of the auxiliary tightening device 112 which is disposed opposite the working end 113, in the direction of the arrow Z, the two surfaces of the upper and of the lower end of the band, at which abuts the auxiliary tightening device, are moved away from one another and thus the band is tightened.

While I have shown and described several embodiments in accordance with the present invention, it is understood that the same is not limited thereto but is susceptible of numerous changes and modifications as known to those skilled in the art. For example, the clamp of the present invention also operates with kinematic reversal. To that end, the barbs 11 are provided between the slot 9 and the upper end 2 or the perforation apertures 3. It is then possible to contract the clamp in that the elements of the tightening device are moved away from one another instead of being moved toward one another. Hence, I do not wish to be limted to the details shown and described herein, but intend to cover all such changes and modifications as are encompassed by the scope of the appended claims.

What I claim is:

1. A clamp for clamping a hose onto a nipple by means of a band means adapted to be closed, which is provided at its upper end with perforation apertures and at its lower end with at least one barb which engages in one of the perforation apertures when the band is placed about the hose, and in which the band is provided with further perforation apertures of similar type at its lower end on the side of the barb nearer the end thereof and is additionally provided with a slot at its upper end, at least one section of the perforation apertures disposed adjacent the lower end being located within the area of the section of the slot adjacent the upper end of the band after placing the band about the hose, characterized in that the upper end of the band is provided with at least one barb means having a tip pointing in a circumferential direction opposite the tip of the barb of the lower end of the band for eventual engagement with one of two mutually movable coupling elements of a tightening means whose other coupling element is adapted to engage in a further perforation aperture of the lower end of the band, whereby said tightening device is firmly anchored by each of said at least one barb means at the upper end of the band during assembly and disassembly of said band, and characterized in that the extreme end portion of the lower end of the band is curved radially outwardly with respect to a hose to be clamped for preventing cutting of the hose by said extreme end portion during tightening of the band.

2. A tightening device for the assembly and disassembly of the clamp according to claim 1, which enables the engagement of the barb means in the perforation aperture corresponding to the assembled condition of the clamp, said tightening device being adapted to be attached to the band during assembly and disassembly of the clamp and being removable after the assembly or disassembly has taken place, characterized in that the tightening device includes two coupling elements movable with respect to one another for purposes of tightening the clamp, one of said coupling elements engaging in at least one of the perforation apertures of the lower end of the band while the barb means of the upper end of the band engages in the other coupling element.

3. A clamp according to claim 1, characterized in that the lower end of the band includes an upwardly bent tongue which is guided in the slot.

4. A clamp according to claim 1, characterized in that the band has a flat configuration, whereby a prestress existing in the assembled condition of the clamp is produced only by elastic deformation of the hose.

5. A clamp according to claim 1, wherein said slot is disposed in the circumferential direction toward the lower end with respect to the perforation apertures present at the upper end, and wherein the barb means provided at the upper end of the band is positioned between the perforation apertures of the upper end of the band and the barb of the lower end of the band.

6. A clamp according to claim 5, characterized in that the band is provided with at least one elastically deformable ear-shaped bulge means.

7. A clamp according to claim 5, characterized in that the band is provided with at least one contractible ear-shaped bulge means.

8. A clamp according to claim 7, characterized in that the contractible ear-shaped bulge means is provided with an indentation within the area of its crown.

9. A clamp according to claim 8, characterized in that the indentation has an eliptical shape extending in the circumferential direction of the band.

10. A clamp according to claim 5, characterized in that the band is divided at least in one place, and in that each band end is provided with a perforation aperture, said last-mentioned perforation apertures overlapping one another in such a manner that they coincide substantially with one another, and spring means connecting the band ends including a ring-shaped center portion and two flat end portions, said spring means being so extended through the aligned perforation apertures that the end portions extend on the outside of the hose in mutually opposite directions and the band ends move toward one another during the tightening of the clamp.

11. A clamp according to claim 10, characterized in that the center portion is provided with an indentation within the area of its crown.

12. A clamp according to claim 10, characterized in that the center portion accommodates an approximately cylindrical member of elastic material.

13. A clamp according to claim 5, characterized in that the barb means is disposed circumferentially spaced from the slot at the side of the slot which is closest to said lower end.

14. A clamp according to claim 5, characterized in that the band has a flat configuration, whereby a prestress existing in the assembled condition of the clamp is produced only by elastic deformation of the hose.

15. A clamp for clamping a hose onto a nipple by means of a band means adapted to be closed, which is provided at its upper end with perforation apertures and at its lower end with at least one barb which engages in one of the perforation apertures when the band is placed about the hose, and in which the band is provided with further perforation apertures of similar type at its lower end on the side of the barb nearer the end thereof and is additionally provided with a slot at its upper end, at least one section of the perforation apertures disposed adjacent the lower end being located within the area of the section of the slot adjacent the upper end of the band after placing the band about the hose, characterized in that the upper end of the band is provided with at least one barb means having a tip pointing in a direction opposite the tip of the barb of the lower end of the band for eventual engagement with one of two mutually movable coupling elements of a tightening means whose other coupling element is adapted to engage in a further perforation aperture of the lower end of the band, and characterized in that the extreme end portion of the lower end of the band is curved radially outwardly with respect to a hose to be clamped for preventing cutting of the hose by said extreme end portion during tightening of the band, and characterized in that the barb means is disposed circumferentially spaced from the slot at the side of the slot which is closest to said lower end.

16. A clamp for clamping a hose onto a nipple by means of a band means adapted to be closed, which is provided at its upper end with perforation apertures and at its lower end with at least one barb which engages in one of the perforation apertures when the band is placed about the hose, and in which the band is provided with further perforation apertures of similar type at its lower end on the side of the barb nearer the end thereof and is additionally provided with a slot at its upper end, at least one section of the perforation apertures disposed adjacent the lower end being located within the area of the section of the slot adjacent the upper end of the band after placing the band about the hose, characterized in that the upper end of the band is provided with at least one barb means having a tip pointing in a direction opposite the tip of the barb of the lower end of the band for eventual engagement with one of two mutually movable coupling elements of a tightening means whose other coupling element is adapted to engage in a further perforation aperture of the lower end of the band, characterized in that the extreme end portion of the lower end of the band is curved radially outwardly with respect to a hose to be clamped for preventing cutting of the hose by said extreme end portion during tightening of the band, and characterized in that the boundary wall of the slot is provided within the area of its surface pointing away from the upper end of the band with an outwardly directed bulge means and in that an auxiliary tightening device is provided which is constructed as strip-shaped instrument having a working end which is slightly narrower than the width of the perforation apertures of the lower end of the band, said auxiliary tightening device, for purposes of tightening, abutting on the one hand, at the boundary wall of a perforation aperture of the lower end of the band within the area of its surface pointing away from the lower end of the band and, on the other, at the boundary wall of the slot within the area of its surface pointing away from the upper end of the band, and said auxiliary tightening device being pivoted in such a manner that the two surfaces move away from one another.

17. A clamp according to claim 16, characterized in that the auxiliary tightening device is provided with a tongue which is slightly narrower than the width of the perforation apertures of the lower end of the band whereby wings are provided on both sides of the tongue which extend perpendicularly to the axis.

18. Apparatus for clamping a hose onto a nipple including a clamp and a tightening device for assembly and disassembling said clamp about the hose,
wherein said clamp includes a band which is provided at its upper end with perforation apertures and at its lower end with at least one barb which engages in one of the perforation apertures when the band is placed about the hose, said band being provided with further perforation apertures of similar type at its lower end, said band being additionally provided with a slot at its upper end, at least one section of the perforation apertures disposed adjacent the lower end being located within the area of the section of the slot adjacent the upper end of the band after placing the band about the hose, the upper end of the band being provided with at least one barb means having a tip pointing in a circumferential direction opposite the tip of the barb of the lower end of the band, and
wherein said tightening device includes means enabling the engagement of the barb in the perforation aperture corresponding to the assembled condition of the clamp, said tightening device being adapted to be attached to the band during assembly and disassembly of the clamp and being removable after the assembly or disassembly has taken place, the tightening device including two coupling elements movable with respect to one another for purposes of tightening the clamp, one of said coupling elements engaging in at least one of the perforation apertures of the lower end of the band while the barb means of the upper end of the band engages in the other coupling elements, said coupling elements bein pivotal with respect to one another to facilitate changes in diameter of the band during assembly and disassembly operation, said pointing of said tip of the barb means at said upper end of the band in a circumferential direction opposite the tip of the barb means of the lower end of the band assuring a firm anchoring of said tightening device during assembly and disassembly operations.

19. Apparatus according to claim 18, characterized in that the band is divided at least in one place, and in that each band end is provided with a perforation aperture, said last-mentioned perforation apertures overlapping one another in such a manner that they coincide substantially with one another, and spring means connecting the band ends including a ring-shaped center portion and two flat end portions, said spring means being so extended through the aligned perforation apertures that the end portions extend on the outside of the hose in mutually opposite directions and the band ends move toward one another during the tightening of the clamp.

20. Apparatus according to claim 19, characterized in that the tightening device includes a lever, a toothed wheel rigidly connected with said lever and having essentially parallel tooth flanks, a pitch corresponding to the perforation apertures and an axis perpendicular to the axis of the lever, and a relatively short curved band whose radius corresponds approximately to the radius of the hose, said band being pivotally connected at the lever about the axis of the toothed wheel and being provided at its free end with at least one perforation aperture, said barb means engaging in said last-mentioned perforation aperture, and depending on the rotational position of the tooth wheel, one tooth thereof engages in a perforation aperture of the lower end of the band.

21. Apparatus according to claim 20, characterized in that the lower end of the band includes an upwardly bent tongue which is guided in the slot.

22. Apparatus according to claim 21 characterized in that the band of the tightening device is provided with a slot disposed between the perforation aperture thereof and the toothed wheel for receiving the tongue of the lower end of the band.

23. Apparatus according to claim 19, characterized in that the tightening device includes a sleeve means provided with a longitudinal slot and a threaded spindle means rotatable within the sleeve means and axially fixed with respect thereto, a counter member threadably mounted on the spindle means which is axially movable in the longitudinal slot and is non-rotatably guided with respect to the sleeve means, at least one of the two parts consisting of sleeve means and counter member being provided with an aperture means and the other part with a hook means, said hook means engaging in a perforation aperture of the lower end of the band and the barb means of the upper end of the band engaging in the aperture means of the tightening device.

24. Apparatus according to claim 23, characterized in that the tip of the hook means is directed toward the aperture means.

25. Apparatus according to claim 23, characterized in that the boundary wall of at least one perforation aperture of the lower end of the band is provided within the area of a surface pointing in the circumferential direction with a bulge means directed radially outwardly upwardly.

26. Apparatus according to claim 1, characterized in that the bulge means is provided within the area of the surface of the perforation aperture pointing away from the lower end of the band.

27. Apparatus according to claim 19, characterized in that the center portion accommodates an approximately cylindrical member of elastic material.

28. Apparatus for clamping a hose and a nipple including a clamp and a tightening device for assembling and disassembling the clamp, wherein said clamp includes a band having first and second means spaced from one another along the length of the band, said first and second means being releasably interengageable with one another to hold said band in at least one predetermined clamping position, wherein said tightening device includes first and second coupling elements engageable with said band at respective spaced positions along the length of said band and forcing means for forcibly moving said first and second coupling elements with respect to one another to effect movement of said first and second means of said band to positions accommodating interengagement and disengagement of said first and second means with respect to one another, and wherein said first coupling element is pivotally mounted with respect to said second coupling element to accommodate changes in the diameter and curvature of portions of the band intermediate the coupling elements during assembly and disassembly operations, wherein the tightening device includes: a sleeve means provided with a longitudinal slot, a threaded spindle means rotatable within the sleeve means and axially fixed with respect to the sleeve means, and a counter member threadably mounted on the spindle means which is axially movable in the longitudinal slot and is non-rotatably guided with respect to the sleeve means, said first coupling element being movable with said counter member.

29. Apparatus according to claim 28, wherein said second coupling element is pivotally connected to said sleeve means.

30. Apparatus according to claim 29, wherein said first coupling element is a hook engageable in detent means of said band, and wherein said second coupling element includes detent means engageable with barbs of said band.

31. Apparatus for clamping a hose and a nipple including a clamp and a tightening device for assembly and disassembling the clamp,
wherein said clamp includes a band having first and second means spaced from one another along the length of the band, said first and second means being releasably interengageable with one another to hold said band in at least one predetermined clamping position,
wherein said tightening device includes first and second coupling elements engageable with said band at respective spaced positions along the length of said band and forcing means for forcibly moving said first and second coupling elements with respect to one another to effect movement of said first and second means of said band to positions accommodating interengagement and disengagement of said first and second means with respect to one another,
wherein said first coupling element is pivotally mounted with respect to said second coupling element to accommodate changes in the diameter and curvature of portions of the band intermediate the coupling elements during assembly and disassembly operations, and
wherein said first coupling element is a tooth on a toothed wheel which is releasably engageable in detent means in said band, and wherein said second coupling element is a detent means in a curved band member which is pivotally mounted to said toothed wheel, said detent means in said curved band member being engageable with a portion of said band.

32. Apparatus according to claim 31 wherein said forcing means includes a manually engageable lever formed rigidly with said toothed wheel.

33. Apparatus according to claim 32, wherein said first means is at least one aperture in said band, and wherein said second means is at least one barb engageable in said aperture.

34. Apparatus according to claim 33, wherein said detent means in said band and in said curved band member are apertures in said respective band and curved band member, and wherein said portion of said band engageable with said aperture of said curved band member is a barb on said band.

35. A tightening device for assembling and disassembling a hose and nipple clamp of the type having a band with first and second releasably interengageable means spaced from one another along the length of the band; said tightening device comprising:
first and second coupling elements engageable with said band at respective spaced positions along the length of said band,
and forcing means for forcibly moving said first and second coupling elements with respect to one another to effect movement of said first and second means of said band to positions accommodating interengagement and disengagement of said first and second means with respect to one another,
wherein said first and second coupling elements are mounted for pivotal movement with respect to one another to accommodate changes in the diameter and curvature of portions of the band intermediate the coupling elements during assembly and disassembly operations, and
wherein said first coupling element is a tooth on a toothed wheel which is releasably engageable in detent means in said band, and wherein said second coupling element is a detent means in a curved band member which is pivotally mounted to said toothed wheel, said detent means in said curved band member being engageable with a portion of said band.

36. A device according to claim 35, wherein said forcing means includes a manually engageable lever formed rigidly with said toothed wheel.

37. A tightening device for assembling and disassembling a hose and a nipple clamp of the type having a band with first and second releasably interengageable means spaced from one another along the length of the band; said tightening device comprising:

first and second coupling elements engageable with said band at respective spaced positions along the length of said band, and forcing means for forcibly moving said first and second coupling elements with respect to one another to effect movement of said first and second means of said band to positions accommodating interengagement and disengagement of said first and second means with respect to one another, wherein said first and second coupling elements are mounted for pivotal movement with respect to one another to accommodate changes in the diameter and curvature of portions of the band intermediate the coupling elements during assembly and disassembly operations, and wherein the tightening device includes: a sleeve means provided with a longitudinal slot, a threaded spindle means rotatable within the sleeve means and axially fixed with respect to the sleeve means, and a counter member threadably mounted on the spindle means which is axially movable in the longitudinal slot and is non-rotatably guided with respect to the sleeve means, said first coupling element being movable with said counter member.

38. A device according to claim 37, wherein said second coupling element is pivotally connected to said sleeve means.

39. A device according to claim 38, wherein said first coupling element is a hook engageable in detent means of said band, and wherein said second coupling element includes detent means engageable with barbs of said band.

40. A clamp for clamping a hose and a nipple comprising:

a band, first and second means spaced from one another along the length of the band, said first and second means being releasably interengageable with one another to hold said band in at least one predetermined clamping position, third and fourth means spaced from one another and from said first and second means along the length of the band, said third and fourth means being engageable with respective coupling elements of a tightening device for moving said third and fourth means with respect to one another to accommodate relative movement of and interengagement and disengagement of said first and second means, wherein said third means is a bulge formed at the edge of an aperture in said band which bulge extends radially outward of immediately adjacent portions of the band for accommodating firm engagement with a hook of the coupling elements while preventing said hook from directly engaging with a hose being clamped, and wherein said aperture with said bulge is on a first portion of the band which is radially inward of a slot on a second portion of the band overlapping said first portion when said band is in a clamping position, said slot accommodating said hook for penetration through said slot and into said aperture.

41. Apparatus for clamping a tubular member onto a nipple including a closable clamping band, said closable clamping band comprising:

a first set of perforation apertures adjacent a first end of the band, at least one band closing barb adjacent the second end of the band which closing barb is engageable in one of the perforation apertures of said first set to hold said band in a closed position with said first end overlapping said second end, a second set of apertures adjacent the second end of the band, there being a slot extending circumferentially along a portion of said band which slot is aligned with at least some of the apertures of said second set when said band is placed about said tubular member, said apertures of said second set being engageable with one of two relatively movable parts of a band tightening device, and support means spaced from the first end of the band for accommodating engagement of the other of the two movable parts of the tightening device, wherein said support means includes at least one tensioning barb disposed on the band at the side of the slot opposite said first end, each of said at least one tensioning barbs facing radially outwardly and circumferentially opposite the circumferential direction which said at least one band closing barb faces when said band is in a closed position on said tubular member, whereby said tightening device is firmly anchored by each of said at least one tensioning barbs during assembly and disassembly of said band.

* * * * *